July 4, 1933.  P. F. SHIVERS  1,916,814
RADIATOR VALVE
Filed Dec. 18, 1930  2 Sheets-Sheet 1

INVENTOR.
Paul F. Shivers,
BY
Hood & Hahn.
ATTORNEYS

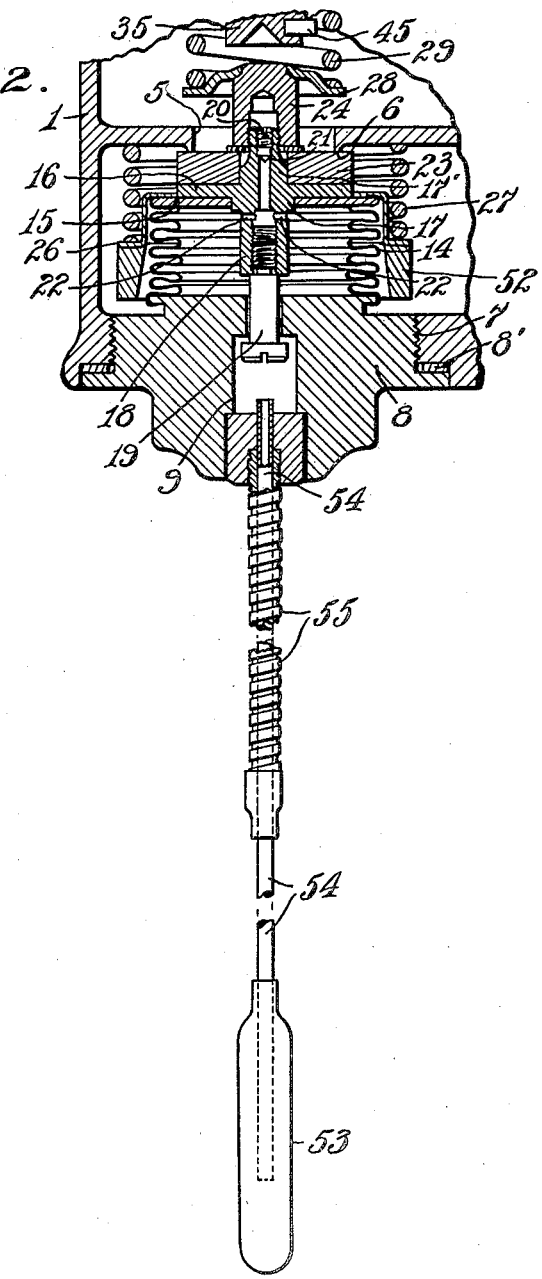

Patented July 4, 1933

1,916,814

UNITED STATES PATENT OFFICE

PAUL F. SHIVERS, OF WABASH, INDIANA, ASSIGNOR TO MINNEAPOLIS-HONEYWELL REGULATOR COMPANY, OF MINNEAPOLIS, MINNESOTA, A CORPORATION OF DELAWARE

RADIATOR VALVE

Application filed December 18, 1930. Serial No. 503,190.

The object of my invention is to produce an efficient, attractive automatic valve, responsive to temperature variations at a desired point, for automatically controlling the flow of fluid therethrough, the device being primarily designed for use in the control of the flow of a heating medium, such as hot water or steam, to a radiator.

The accompanying drawings illustrate my invention.

Fig. 2 is a fragmentary medial section of a modification.

Figure 1:
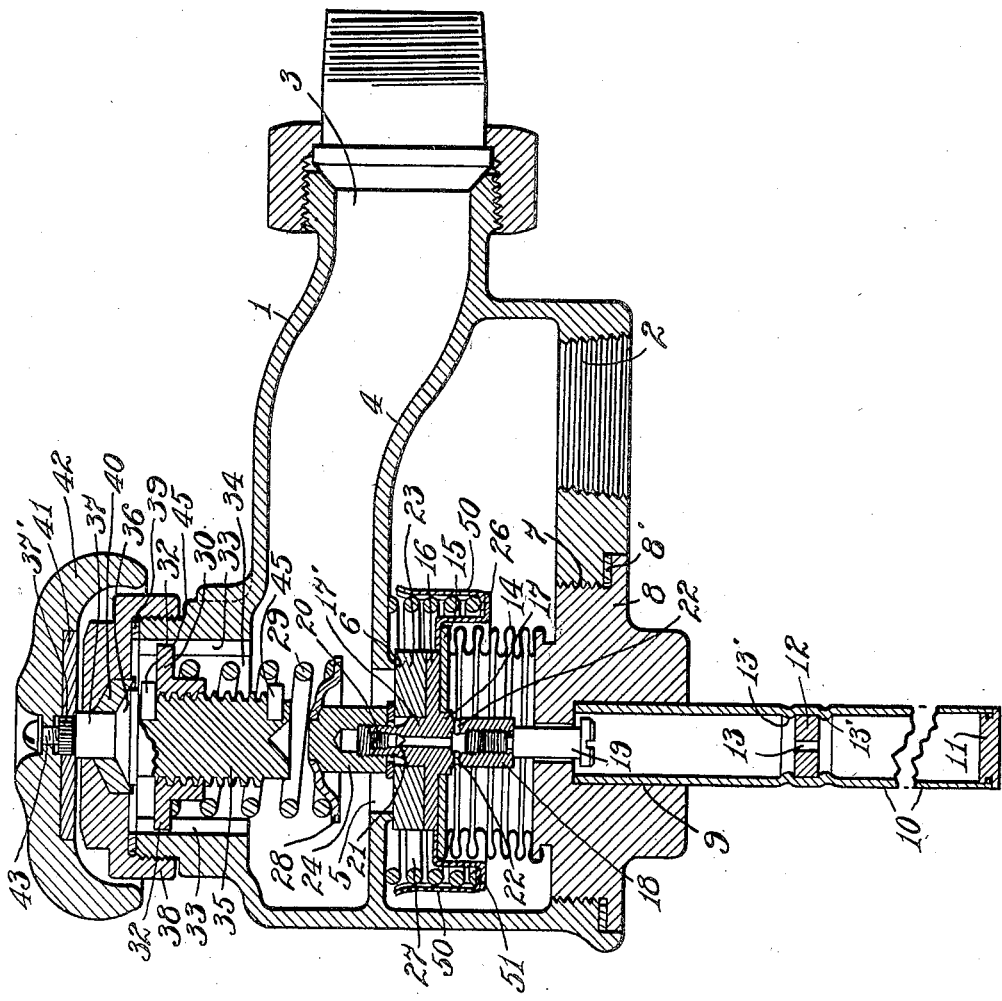
Fig. 1 is a medial section of an embodiment of my invention.

In the drawings 1 indicates a hollow main body having an inlet 2, an outlet 3 and divided into inlet and outlet chambers by an intermediate partition 4 provided with an opening 5 which affords communication between the inlet and outlet chambers. On the inlet side of opening 5 is an annular valve seat 6.

On the inlet side, the casing 1 is provided with a threaded opening 7 which receives a threaded plug 8 formed to be associated with casing 1 and conveniently made gas-tight by means of the gasket 8'. Plug 8 is provided with an axial bore 9, enlarged at its outer end to receive the upper end of a tube 10 conveniently brazed in the bore. The lower end of tube 10 is closed by a head 11 and at an intermediate point in the length of the tube is a diaphragm 12 having a restricted opening 13 therethrough providing restricted communication between the two ends of the tube. Diaphragm 12 is conveniently made so as to have a close sliding fit in the bore of tube 10 and is retained in axial position by distorting the wall of tube 10, above and below the diaphragm, inwardly, as indicated at 13'.

Brazed to the inner end of plug 8 is the lower end of a bellows 14 to the upper end of which is brazed a head 15 to the upper face of which is brazed the flange 16 of a tubular shank 17 the lower end 18 of which lies within the chamber formed by the bellows 14. The lower end of the bore of shank 17 is threaded to receive the upper end of the screw 19 which, in assembly, is inserted through tube 10 before head 11 and diaphragm 12 are put in place, the arrangement being such that the head of said screw may engage plug 8 to limit the expansive movement of bellows 14.

The diameter of the main body of screw 19 is sufficiently less than the smaller portion of the bore of plug 8, through which it extends, to permit free passage of vapor between tube 10 and the interior of bellows 14.

The upper end 17' of shank 17 is internally threaded to receive a threaded plug valve 20 which may be seated on the seat 21 formed in the bore of the shank, and lateral passages 22 afford communication between the interior of bellows 14 and the upper end of the bore of shank 17, the arrangement being such that a desired quantity of volatile liquid, such as $SO_2$, may be injected into tube 10 and sealed therein by seating the plug valve 20 on its seat 21. As an insurance of gas-tightness the plug 21 is preferably soldered in place.

Mounted upon plate 16, in position to cooperate with valve seat 6, is a valve disc 23 held in place by a nut 24 threaded upon the upper threaded end of shank 17.

Hung upon head 15 is an annulus 26 which is conveniently Z-shaped in cross section and forms an abutment for the lower end of a compression spring 27, the upper end of which engages partition 4.

Resting upon the upper end of nut 24 is a ring or disc 28 which forms an abutment for the lower end of a compression spring 29. The upper end of spring 29 engages an axially adjustable abutment 30 which is in the form of a nut having one or more radial fingers 32 slidably arranged in grooves 33 formed through the wall of a casing 1 on the outlet side and in axial alignment with opening 5.

Threaded through nut 30 is an adjusting screw 35 having an intermediate tapered collar 36 which is surmounted by a reduced plain shank 37 which projects through a cap 38 threaded upon casing 1 enclosing the outer end of opening 34.

The connection between cap 38 and casing 1 is made gas-tight by gasket 39 and the association of screw 35 with cap 38 is made gas-tight by a gasket 40 with which the tapered collar 36 coacts. The end of shank 37 which projects beyond cap 38 is knurled, as indicated at 37', to receive, nonrotatively, a metal plate 41 which is imbedded in an operating head 42 which is conveniently of bakelite or some similar material, said head being held in place by a screw 43 threaded into the upper end of the shank of screw 35. Screw 35 is provided with pins 45, 45 which serve to limit the possible travel of nut 30 on screw 35, and thus fix the upper and lower limits of adjustability of the effective strength of spring 29.

In devices of this character, under some conditions of operation, steam entering the valve causes spring 27 to vibrate and produce a humming. One way of eliminating this humming is by providing a plurality of light spring fingers 50 (Fig. 1), which will frictionally engage the several convolutions of the spring 27. These fingers may be conveniently anchored in an annulus 51 interposed between the lower end of spring 27 and its abutment 26.

Another way of eliminating the humming of spring 27 is by weight-loading the lower abutment of the spring and this may be readily accomplished by weighting the lower outwardly projecting flange of the annulus 26 by lead or some other heavy metal, as indicated at 52 in Fig. 2.

The operation is as follows:

A sufficient quantity of a volatile liquid such as $SO_2$ to fill or partially fill that portion of tube 10 which is below diaphragm 12 is sealed within the structure as already described, a sufficient quantity being provided so that there will be a slight excess at the highest temperature which is desired to be maintained, the arrangement being such that disc 23 will be urged toward its seat 6 by the vapor pressure within bellows 14 in opposition to the action of springs 27 and 29.

Springs 27 and 29 are so proportioned that the effect of spring 27 and the minimum cumulative effect of spring 29 will be such as to unseat disc 23 from seat 6 when the temperature of the volatile liquid in the lower end of tube 10 is the lowest which is desired to be maintained, so that, by adjusting nut 30 downwardly, by rotation of screw 35 through the medium of head 42, higher temperatures may be automatically maintained.

Whenever the temperature of the volatile medium in the lower end of tube 10 falls below a desired minimum, depending upon temperature characteristics of that medium, the strength of spring 27 and the adjusted strength of spring 29, valve disc 23 will be forced from its seat by the combined action of the two springs, thus permitting steam to flow from the inlet to the outlet and thence to the radiator, and whenever temperature of the lower end of tube 10 is raised to the desired maximum, the vapor pressure created in bellows 14 by that rise in temperature will force valve 23 to its seat.

It will be noted that in this construction the valve disc 23 floats between the bellows and the springs and is not otherwise guided so that there is a minimum of frictional resistance due to movement of the valve disc.

I have found that where, in previous structures, a sliding guide has been provided for the valve disc, a sufficient amount of frictional resistance is afforded to materially decrease the sensitiveness of modulation.

The provision of the two springs 27 and 29, both acting in opposition to the vapor pressure developed within the bellows 14, materially decreases the amount of force necessary to be applied to the adjusting head 42 to adjust nut 30 for a wide range of action of the valve.

In the present structure the lower spring 27 continually exerts enough pressure against the bellows 14 so that valve disc 23 will leave its seat 6 at, say, forty degrees Fahr., even though nut 30 is at its upper limit, at which time spring 29 is only sufficiently compressed to hold collar 36 seated on gasket 40 with sufficient force to make a steam-tight joint at this point. Nut 30 may then, by adjustment downwardly, put spring 29 under sufficient compression so that the modulating temperature of the valve may be carried upwardly, say through a range of forty degrees or more, without requiring too great an effort to be exerted upon the adjusting head 42.

It will be readily understood that the liquid-containing function of tube 10 may be performed by a capsule 53 (Fig. 2) connected to the bore of plug 8 by a small bore tube 54 of indefinite length and protected in part or in whole by a flexible sheath 55.

I claim as my invention:

1. A thermo-responsive valve comprising inlet and outlet chambers and an interposed valve seat, a bellows mounted in one of said chambers, a container for volatile liquid arranged in communication with said bellows, a valve carried by said bellows and positioned to coact with said valve seat, a coiled spring acting upon said bellows in opposition to pressure therein created by the volatile liquid, and a yieldable resistance element associated with said spring to damp axial vibrations thereof.

2. A thermo-responsive valve comprising inlet and outlet chambers and an interposed valve seat, a bellows mounted in one of said chambers, a container for volatile liquid arranged in communication with said bellows, a valve carried by said bellows and positioned to coact with said valve seat, a coiled spring acting upon said bellows in opposition to pressure therein created by the volatile liquid, and spring fingers arranged to engage the convolutions of said spring to damp vibrations thereof.

3. A thermo-responsive valve comprising inlet and outlet chambers and an interposed valve seat, a bellows mounted in one of said chambers, a container for volatile liquid arranged in communication with said bellows, a valve carried by said bellows and positioned to coact with said valve seat, a coiled spring mounted in one of said chambers and normally acting upon said bellows in opposition to pressure therein created by the volatile liquid, and a weight element interposed between said spring and said bellows, said weight element being so proportioned relative to the periods of vibration of the spring as to damp such vibration caused by the passage of fluid over said spring.

4. A thermo-responsive valve comprising inlet and outlet chambers and an interposed valve seat, a bellows mounted in one of said chambers, a container for volatile liquid arranged in communication with said bellows, a valve carried by said bellows and positioned to coact with said valve seat, an annular spring seat carried by the free end of said bellows, a coiled spring abutted against said spring seat and a series of spring fingers associated with said spring seat and frictionally engaging the convolutions of the spring.

5. A thermo-responsive valve comprising inlet and outlet chambers and an interposed valve seat, a bellows mounted in one of said chambers, a container for volatile liquid arranged in communication with said bellows, a valve carried by said bellows and positioned to coact with said valve seat, an annular spring seat carried by the free end of said bellows, a coiled spring abutted against said spring seat and an annular weight carried by said spring seat and of sufficient weight to damp temperature-change vibrations of the spring.

6. A thermo-responsive valve comprising a main casing having inlet and outlet chambers and an interposed valve seat, a bellows mounted in one of said chambers, a valve operatively associated with said bellows and positioned to coact with said valve seat, a container for volatile liquid communicating with said bellows, a spring mounted in one of said chambers and arranged to normally act upon said bellows in opposition to its expansion, a second spring arranged to act upon said bellows in opposition to its expansion and in the same direction as the first spring, an adjustable abutment for said second spring, and means accessible from the exterior of the casing by which the position of said adjustable abutment may be adjusted to vary the effective force of said second spring upon the bellows.

7. A thermo-responsive valve comprising a main casing having inlet and outlet chambers and an intermediate valve seat, a removable plug mounted in the outer wall of the inlet chamber, a bellows carried by the inner end of said plug, a container for volatile liquid carried by said plug and communicating with said bellows, a valve operatively associated with the free end of said bellows and arranged to coact with the valve seat, a coiled spring having one end anchored and the other end abutting against the bellows in opposition to expansion of said bellows, a second spring mounted in the outlet chamber, an abutment, carried by the free end of the bellows, for the inner end of said second spring, an abutment for the outer end of said second spring, and means, accessible from the exterior of the casing, for adjusting said last-mentioned abutment to vary the effective strength of said second spring upon said bellows.

8. An element of a thermo-responsive valve, consisting of a plug removably insertible in an opening of the main body of such a valve, a bellows carried by the inner end of said plug, a container for volatile liquid carried by the outer end of said plug and in communication through said plug with the interior of the bellows, a tubular stem sealed upon and projected through the head of the free end of the bellows, an element carried by said stem and having a one-way axially-interlocking engagement with the plug to limit expansive movement of the bellows, a valve adapted to close the outer end of said tubular stem, a valve disc sleeved upon the outer end of said tubular stem, and a valve-disc-retainer threaded upon the outer end of said stem.

9. A thermo-responsive valve comprising a main casing having inlet and outlet chambers and an interposed valve seat, a bellows having one end anchored in one of said chambers with its other end free and projected toward the valve seat, a valve operatively associated with the free end of the bellows in position to cooperate with the valve seat, a coiled spring anchored at one end in said casing and having its free end normally abutted against the free end of the bellows in opposition to expansion of said bellows, a spring abutment mounted in the casing, means for adjusting said abutment axially of the bellows, and a second coiled spring interposed between said abutment and the free end of the bellows.

In witness whereof, I have hereunto set my hand at Wabash, Indiana, this 11 day of December, A. D. one thousand nine hundred and thirty.

PAUL F. SHIVERS.